United States Patent Office 3,446,791
Patented May 27, 1969

3,446,791
DISAZO DYES
John I. Dale III, James M. Straley, and Max A. Weaver, Kingsport, Tenn., assignors to Eastman Kodak Company, Rochester, N.Y., a corporation of New Jersey
No Drawing. Filed Apr. 28, 1966, Ser. No. 545,849
Int. Cl. C07c 113/00; C09b 35/20
U.S. Cl. 260—184                                    4 Claims

ABSTRACT OF THE DISCLOSURE

Water-insoluble disazo compounds containing two phenyl-azo-aniline moieties joined by a

—$CH_2CH_2SO_2CH_2CH_2$— attached to the nitrogen atom of the aniline coupler of each phenyl-azo-aniline moiety. The disclosed disazo compounds are useful as dyes for hydrophobic textile materials such as polyester fibers.

---

This invention relates to novel disazo compounds and, particularly, to water insoluble disazo dyes for hydrophobic textile materials.

The novel disazo compounds of the invention are characterized by the general formula (I)
$$R-N=N-R^1-N\begin{matrix}R^2\\ \\CH_2CH_2SO_2CH_2CH_2\end{matrix}N-R^4-N=N-R$$
$\phantom{xxxxxxxxxxxxxxxxxxxxxxxxxxxxxxx}R^3$ wherein R is a monocyclic carbocyclic aromatic group of the benzene series having the structure

[benzene ring with $X_{(m)}$ substituent]

wherein X represents lower alkyl, e.g., methyl, ethyl; substituted alkyl such as halogenoalkyl, e.g. chloromethyl, trifluoromethyl; lower alkoxy, e.g. methoxy, lower alkanylamino, e.g. acetamido; nitro; halogeno, e.g. chloro, bromo; cyano; lower alkylsulfonyl, e.g. methylsulfonyl; bis(alkylsulfonyl), e.g. 2,4-bis(methylsulfonyl); substituted alkylsulfonyl, e.g. cyanoethylsulfonyl; carbamoyl; benzamido; benzylamino; N-alkylbenzylamino, e.g. N-phenylmethylamino; lower carbalkoxy, e.g. carbethoxy; lower alkanoyl, e.g. acetyl; formyl; sulfamoyl; lower alkylsulfamoyl, e.g. methylsulfamoyl, ethylsulfamoyl; dicarboxylicacidimido, e.g. succinimido; thiocyano; lower alkylthio, e.g. methylthio; benzyloxy; benzoyl; combinations thereof; and $m$ represents 0, 1, 2 or 3;

$R^1$ and $R^4$ represent monocyclic carbocyclic aromatic groups of the benzene series having the structure

[benzene ring with $Y_{(n)}$ substituent]

wherein Y may be the same or different in $R^1$ and $R^4$ and represents lower alkyl, e.g. methyl, ethyl; lower alkoxy, e.g. methoxy; lower alkanoylamino; e.g. acetamido; halogeno, e.g. chloro, bromo; benzylamino; N-alkylphenyl-amino, e.g. N-phenylmethylamino; dicarboxylicacidimido, e.g. succinimido; lower alkylthio, e.g. methylthio; benzyloxy; combinations thereof; and $n$ represents 0, 1, 2, 3 or 4; and $R^2$ and $R^3$ may be the same or different and represent hydrogen or an alkyl radical, preferably lower alkyl, i.e. from 1 to 4 carbon atoms, being unsubstituted or substituted such as hydroxyalkyl, e.g. hydroxyethyl, polyhydroxyalkyl, e.g. 2,3-dihydroxypropyl, lower alkoxyalkyl, e.g. methoxyethyl, cyanoalkyl, e.g. cyanoethyl, cyanoalkoxyalkyl, e.g. beta-cyanoethoxyethyl, lower alkanoyloxyalkyl, e.g. acetoxyethyl, lower carbalkoxyalkyl, e.g. carbethoxyethyl, halogenoalkyl, e.g. chloroethyl, beta-chloropropyl, beta-bromoethyl, hydroxyhalogenoalkyl, e.g. beta-hydroxy-gamma-chloropropyl, lower alkylsulfonylalkyl, e.g. methylsulfonylethyl, lower alkyl-$OCOOCH_2CH_2$— e.g. $CH_3OCOOCH_2CH_2$—, carbamoylalkyl, e.g. carbamoylethyl, lower alkylcarbamoylalkyl, e.g. ethylcarbamoylethyl, carboxylic acid imidoalkyl, e.g. succinimidoethyl; benzyl; phenoxyalkyl, e.g. beta-phenoxyethyl; lower alkylsulfonamidoalkyl, e.g. methylsulfonamidoethyl; carbamatoalkyl, e.g. phenylcarbamatoethyl; and the like.

The disazo compounds of the invention are prepared by coupling the conventional diazonium salts of compounds having the formula (II)                $R-NH_2$ with unsymmetrical coupling components having the formula (III)
$$R^1-N\begin{matrix}R^2\\ \\CH_2CH_2SO_2CH_2CH_2\end{matrix}N-R^4$$
$\phantom{xxxxxxxxxxxxxxxxxxxxxxxxxxxxxx}R^3$ wherein $R^1$ and $R^4$ may be the same or different and $R^2$ and $R^3$ may be the same or different but either $R^1$ must be different than $R^4$ or $R^2$ must be different than $R^3$ or with symmetrical coupling components having the formula (IV)
$$R^1-N\begin{matrix}R^2\\ \\CH_2CH_2SO_2CH_2CH_2\end{matrix}N-R^4$$
$\phantom{xxxxxxxxxxxxxxxxxxxxxxxxxxxxxx}R^3$ wherein $R^1=R^4$ and $R^2=R^3$ and wherein R, $R^1$, $R^2$, $R^3$ and $R^4$ are defined as set forth above with reference to Formula I.

The unsymmetrical couplers of Formula III are prepared by reacting one mole of an appropriately substituted aryl amine with one mole of divinylsulfone in the presence of a catalyst such as acetic acid and contacting the reaction product, a vinylsulfonylethyl aryl amine, with one mole of a different aryl amine, as set forth in the following illustrative sequence:

$$ArN\begin{matrix}R^2\\ \\H\end{matrix} + (CH_2=CH)_2SO_2 \xrightarrow{HoAc} ArN\begin{matrix}R^2\\ \\C_2H_4SO_2CH=CH_2\end{matrix}$$

$$+$$

$$Ar^1N\begin{matrix}R^3\\ \\H\end{matrix}$$

$$\downarrow HoAc$$

$$ArN\begin{matrix}R^2\\ \\C_2H_4SO_2C_2H_4\end{matrix}NAr^1$$
$\phantom{xxxxxxxxxxxxxxxxxxxxx}R^3$ wherein Ar and $Ar^1$ represents either $R^1$ or $R^4$ of Formula I wherein $R^1$ and $R^4$ are the same or different and $R^2$ and $R^3$ are the same or different but either $R^1$ is different than $R^4$ or $R^2$ is different than $R^3$ and are defined as set forth in Formula I.

The symmetrical couplers of Formula IV are prepared by reacting two moles of an appropriately substituted aryl amine with one mole of divinylsulfone in the presence of acetic acid catalyst, as set forth in the following illustrative sequence:

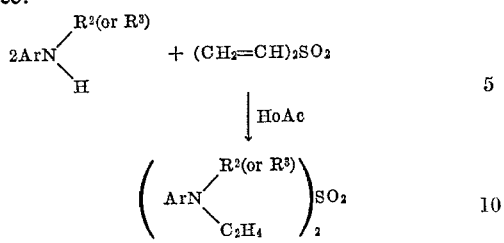

wherein Ar=R$^1$=R$^4$ and R$^2$=R$^3$ and wherein R$^1$, R$^2$, R$^3$ and R$^4$ are defined above in Formula I.

The following examples will serve to illustrate the preparation of representative couplers and disazo compounds of the invention. As will be seen from the examples, the substituents X, Y, R$^2$ and R$^3$ set forth in Formula I serve primarily as auxochrome groups to control the color of the disazo compound.

PREPARATION OF SYMMETRICAL COUPLERS

PREPARATION OF BIS[2-(N-ETHYL-M-TOLUIDINO)ETHYL]SULFONE

An amount of 27.0 g. N-ethyl-m-toluidine, 11.8 g. divinylsulfone, 5 cc. glacial acetic acid, and 50 cc. toluene was refluxed for 24 hr. The toluene and acetic acid were removed under vacuum and the residue taken up in 150 ml. of ethanol. This solution was chilled for 2 hr. at near 0° C. and the white crystalline product was collected by filtration. Yield 21.4 g. M.P. 58–61°. It had the structure:

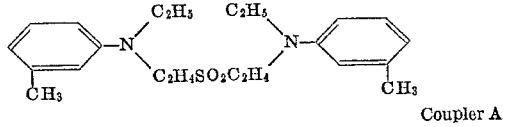

Coupler A

PREPARATION OF BIS[2-(N-BETA-HYDROXYETHYL-M-TOLUIDINO)ETHYL]SULFONE

The above procedure was repeated, substituting N-beta-hydroxyethyl-m-toluidine for N-ethyl-m-toluidine. The product had the structure:

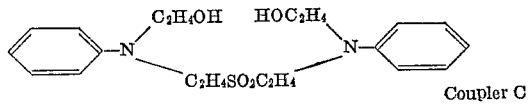

Coupler B

PREPARATION OF BIS[2-(N-BETA-HYDROXYETHYLANILINO)ETHYL]SULFONE

An amount of 31.0 g. of 2-anilinoethanol, 11.8 g. divinylsulfone, 5 cc. glacial acetic acid and 50 cc. toluene was refluxed for 24 hours. The solvents and unreacted starting materials were distilled off leaving a residue which hardened to a glass. Attempts to crystallize it from ethanol were unsuccessful. The coupler had the structure:

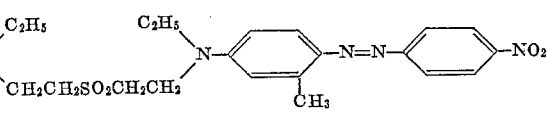

Coupler C

PREPARATION OF SYMMETRICAL DYES

Example 1

An amount of 6.9 g. p-nitroaniline was dissolved in 5.4 conc. sulfuric acid and 12.6 ml. water. This solution was poured onto 50 g. of ice, and a solution of 3.6 g. of sodium nitrite in 8 ml. water was added all at once. The diazotization was stirred at 5° for 1 hr. resulting in almost complete solution. After filtration, the diazonium solution was added to a chilled solution of 7.76 g. of bis[2-(N-ethyl-m-toluidino)ethyl]sulfone in 50 ml. 1:5 acid (1 part propionic acid:5 parts acetic acid). The solution was neutralized to a brown color with solid ammonium acetate and after two hours was drowned in water. The precipitated dye was filtered, washed with water and dried. It dyed cellulose acetate, polyesters and nylon bright orange shades and showed exceptional sublimation fastness when dyed on polyester fibers. The dye had the structure:

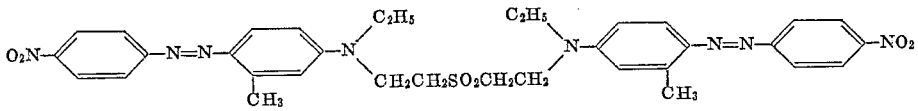

Example 2

An amount of 3.6 g. sodium nitrite was added to 50 ml. of conc. sulfuric acid, keeping the temperature below 80° C. To the solution was added 100 ml. 1:5 acid below 20° C. After further cooling to 5° C., 6.36 g. p-chloroaniline was added followed by 100 ml. of 1:5 acid. This solution was stirred for 2 hr. at 0–5° C. and then added to a solution of bis[2-(N-beta-hydroxyethyl-m-toluidino)ethyl]sulfone in 50 ml. 1:5 acid. The solution was neutralized to a brown color on Congo Red paper with solid ammonium acetate. After two hours the solution was drowned in water and the precipitated dye washed with water and dried. It dyed polyester, cellulose acetate and nylon fibers bright yellow shades. The dye showed outstanding sublimation fastness on polyester fiber. It had the structure:

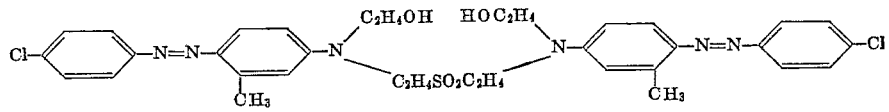

Example 3

A diazonium solution was prepared as in Example 2, substituting 8.60 g. of 2-chloro-4-nitroaniline for the p-chloroaniline. This solution was added to 7.76 g. bis[2-(N-ethyl-m-toluidino)ethyl]sulfone in 50 ml. 1:5 acid. The resulting solution was neutralized to brown on Congo Red paper with ammonium acetate and coupled for 2 hours. The solution was drowned in water and filtered. The precipitate was filtered, washed with water and air dried. It gave bright scarlet dyeings on polyesters which had outstanding resistance to sublimation. The dye had the structure:

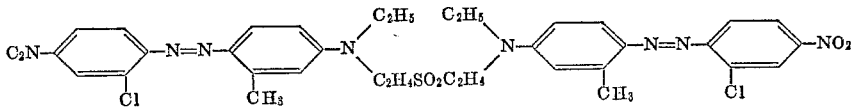

Example 4

A diazonium solution was prepared as in Example 2, substituting 11.80 g. of 2-methylsulfonyl-4-nitroaniline for the p-chloroaniline. The diazonium solution was added to a solution of 7.76 g. bis[2-(N-ethyl-m-toluidino)ethyl] sulfone in 50 ml. 1:5 acid. The reaction mixture was neutralized to a brown in water and filtered. The dye which precipitated was washed with water and air dried. It gave violet shades of good light fastness and excellent sublimation fastness on polyesters. The dye had the structure:

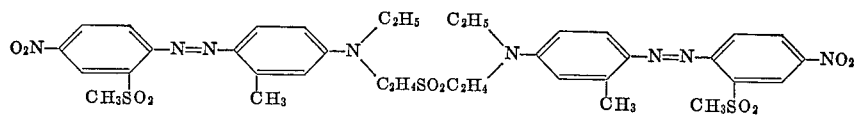

Example 5

To a solution of 10.70 g. of coupler C in 50 ml. 1:5 acid was added a diazonium solution prepared from 8.60 g. 2-chloro-4-nitroaniline as in Example 1. The dye thus obtained gave bright orange dyeings on polyesters of excellent sublimation fastness. It had the structure:

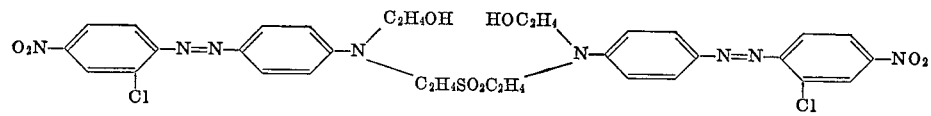

Example 6

An amount of 3.97 g. of the dye obtained in Example 5 was taken up in 25 ml. pyridine. 2.0 g. acetyl chloride was added dropwise and the solution was heated for 1 hour on the steam bath at 85–90°. The dye was reprecipitated by drowning in dilute hydrochloric acid and was filtered and washed. It gave orange, sublimation fast dyeings on polyesters with good light fastness. It had the structure:

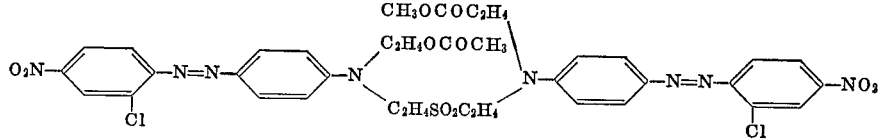

The disazo compounds illustrated in the following table were prepared by the procedure illustrated in Examples 1 to 6, above. Thus, the appropriate compounds of Formula II were coupled with suitable compounds of Formula IV to obtain the compounds of Formula I wherein $R^1=R^4$ and $R^2=R^3$.

TABLE

| Example | Substituent (x) on R | $R^1$, $R^4$ | $R^2$, $R^3$ | Color |
|---|---|---|---|---|
| 7 | p-$NO_2$ | m-tolylene | —$CH_2CH_2CN$ | Orange. |
| 8 | p-$NO_2$ | m-tolylene | —$CH_2CH_2Cl$ | Do. |
| 9 | p-$NO_2$ | m-tolylene | —$CH_2CH_2OCH_3$ | Do. |
| 10 | p-$NO_2$ | m-tolylene | —$CH_2CH_2OCOCH_3$ | Do. |
| 11 | p-$NO_2$ | m-tolylene | —$CH_2CH_2N(COCH_2)(COCH_2)$ | Do. |
| 12 | p-$NO_2$ | m-tolylene | —$CH_2CH_2CO_2C_2H_5$ | Do. |
| 13 | p-$NO_2$ | m-tolylene | —$CH_2CH_2Br$ | Do. |
| 14 | p-$NO_2$ | m-tolylene | —$CH_2CH_2CONH_2$ | Do. |
| 15 | p-$NO_2$ | m-tolylene | —$CH_2CH_2SO_2CH_3$ | Do. |
| 16 | p-$NO_2$ | m-tolylene | —$CH_2CH_2N(CO)(CO)C_6H_4$ (phthalimido) | Do. |
| 17 | p-$NO_2$ | m-tolylene | —$CH_2CH_2OCONH$—$C_6H_5$ | Do. |
| 18 | 2-$NO_2$-4-Cl | m-tolylene | —$C_2H_5$ | Red. |
| 19 | 2-Cl-4-$NO_2$ | phenylene | —$C_2H_5$ | Scarlet. |
| 20 | 2,6-di-Cl-4-$NO_2$ | m-tolylene | —$C_2H_5$ | Yellow-brown. |
| 21 | 2-$CH_3SO_2$-4-$NO_2$ | m-tolylene | —$C_2H_5$ | Red-violet. |
| 22 | None | m-tolylene | —$C_2H_5$ | Yellow. |
| 23 | p-$CH_3SO_2$ | o-tolylene | —H | Yellow. |
| 24 | p-$CH_3CO$ | m-tolylene | —$C_2H_5$ | Yellow-orange. |
| 25 | m-$CH_3CO$ | m-tolylene | —$C_2H_5$ | Orange. |
| 26 | p-Cl | m-tolylene | —$C_2H_5$ | Yellow. |
| 27 | p-CN | m-Cl-phenylene | —$C_2H_5$ | Do. |
| 28 | p-$NO_2$ | o-Cl-phenylene | —H | Do. |
| 29 | p-$CH_3$ | 2-O$CH_3$-5-NHCO$CH_3$-phenylene | —$C_2H_5$ | Do. |
| 30 | p-$SO_2NH_2$ | 2-O$CH_3$-5-$CH_3$-phenylene | —$C_2H_5$ | Red-yellow; |
| 31 | p-$NO_2$ | 2,5-di-O$CH_3$-phenylene | —$C_2H_5$ | Orange. |
| 32 | p-$CH_3CONH$ | m-tolylene | —$C_2H_5$ | Red-orange. |
| 33 | p-$NO_2$ | m-O$CH_3$-phenylene | —$C_2H_5$ | Yellow. |
| 34 | 2,4-di-$CH_3SO_2$ | m-tolylene | —$C_2H_5$ | Orange. |
| 35 | p-$CF_3$ | m-tolylene | —$C_2H_5$ | Red. |
| 36 | p-$SO_2N(CH_3)_2$ | m-tolylene | —$C_2H_5$ | Yellow. |
| 37 | 2,4-di-$NO_2$-6-$C_2H_5NHSO_2$ | m-tolylene | —$C_2H_5$ | Do. |
| 38 | 4-$CH_3SO_2$-2-Cl | m-tolylene | —$C_2H_5$ | Violet. |
| 39 | 2,4-di-$NO_2$-4-Cl | m-tolylene | —$C_2H_5$ | Orange. |
| 40 | 4-$CH_3CO$-2-Cl | m-tolylene | —$C_2H_5$ | Violet. |
| 41 | 4-CHO | m-tolylene | —$C_2H_5$ | Orange. Do. |
| 42 | p-N(CH_2—CO)(CH_2—CO) (succinimido) | m-tolylene | —$C_2H_5$ | Do. |

TABLE—Continued

| Example | Substituent (x) on R | $R^1$, $R^4$ | $R^2$, $R^3$ | Color |
|---|---|---|---|---|
| 43 | p-CH$_3$O— | m-tolylene | —C$_2$H$_5$ | Yellow. |
| 44 | p-⟨phenyl⟩-O— | m-tolylene | —C$_2$H$_5$ | Do. |
| 45 | p-⟨phenyl⟩-SO$_2$ | m-tolylene | —C$_2$H$_5$ | Orange-yellow. |
| 46 | p-⟨phenyl⟩-CO— | m-tolylene | —C$_2$H$_5$ | Do. |
| 47 | p-CONH$_2$ | m-tolylene | —C$_2$H$_5$ | Yellow |
| 48 | p-C$_2$H$_5$OCO— | m-tolylene | —C$_2$H$_5$ | Do. |

PREPARATION OF UNSYMMETRICAL COUPLERS

An amount of 25.3 g. N-ethyl-N-beta-vinylsulfonylethyl-m-toluidine, 15.5 g. N-ethyl-m-chloroaniline, 5 ml. acetic acid and 50 ml. toluene were refluxed for 24 hr. The toluene and acetic acid were removed under vacuum and the residue crystallized from ethanol. The coupler had the structure:

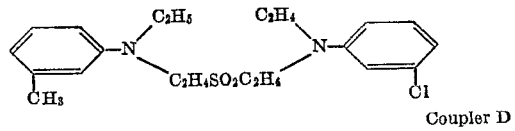

Coupler D

An amount of 29.9 g. 2,5-dimethoxy-N-ethyl-N-beta-vinylsulfonylethylaniline, 13.7 g. 2-anilinoethanol, 5 ml. acetic acid and 50 ml. toluene were refluxed together for 24 hr. The toluene and acetic acid were removed under reduced pressure and the viscous oil obtained was used without further purification. The coupler had the structure:

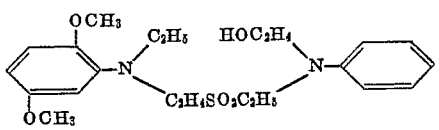

Coupler E

PREPARATION OF UNSYMMETRICAL DYES

Example 49

The diazonium solution was prepared in exactly the same manner as in Example 1 and added to a solution of 8.16 g. of coupler D in 50 ml. 1:5 acid. The reaction mixture was neutralized to brown on Congo Red paper

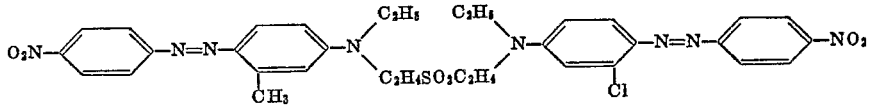

with solid ammonium acetate and allowed to couple 2 hr. The solution was drowned in water and the precipitated dye was filtered, washed with water and air dried. The product dyed polyesters, nylon and cellulose acetate bright orange shades having excellent sublimation fastness on polyesters. The dye had the structure of the above formula.

Example 50

A diazonium solution was prepared from p-chloroaniline as described in Example 2 using the same quantities

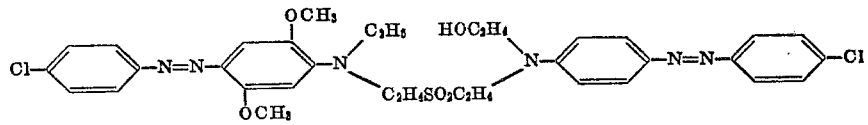

of reagent and it was added to 8.72 g. of coupler E in 50 ml. 1:5 acid. After neutralization and coupling for 2 hr. a dye was precipitated and dried which gave bright yellow-orange shades on polyesters, nylon and cellulose acetate and had excellent sublimation fastness on polyesters. The dye had the structure of the above formula.

The disazo compounds in the following table were prepared by the procedure illustrated in Examples 45 and 46, above. Thus, the appropriate compounds of Formula II were coupled with suitable couplers of Formula III to obtain the compounds of Formula I $R^1=R^4$ and $R^2$ and $R^3$ may be the same or different.

TABLE

| Example | Substituents (x) on R | $R^1$ | $R^2$ | $R^3$ | $R^4$ | Color |
|---|---|---|---|---|---|---|
| 51 | p-NO$_2$ | m-tolylene | —C$_2$H$_5$ | C$_2$H$_4$CN | phenylene | Orange. |
| 52 | 2-NO$_2$-4-Cl | m-chlorophenylene | C$_2$H$_4$ON | C$_2$H$_5$ | m-tolylene | Red-orange. |
| 53 | 4-NO$_2$-2-Cl | o-chlorophenylene | H | C$_2$H$_5$ | m-tolylene | Scarlet. |
| 54 | 2,6-di-Cl-4-NO$_2$ | o-tolylene | H | C$_2$H$_5$ | m-tolylene | Violet. |
| 55 | 2-CH$_3$SO$_2$-4-NO$_2$ | 2-OCH$_3$-5-CH$_3$-phenylene | CH$_2$CH$_2$Cl | C$_2$H$_5$ | m-tolylene | Red-violet. |
| 56 | None | 2-OCH$_3$-5-NHCOCH$_3$-phenylene | CH$_2$CH$_2$OCH$_3$ | C$_2$H$_5$ | m-tolylene | Orange. |
| 57 | p-CH$_3$SO$_2$ | m-OCH$_3$-phenylene | CH$_3$CH$_2$OOCCH$_3$ | C$_2$H$_5$ | m-tolylene | Orange. |
| 58 | p-CH$_3$CO | phenylene | CH$_3$CH$_2$N(COCH$_3$)(COCH$_3$) | C$_2$H$_5$ | m-tolylene | Yellow-orange. |
| 59 | p-CN | phenylene | CH$_3$CH$_2$CO$_2$C$_2$H$_5$ | C$_2$H$_5$ | m-tolylene | Yellow. |
| 60 | 2,4-di-CH$_3$SO$_2$ | phenylene | CH$_2$CH$_2$Br | C$_2$H$_5$ | m-tolylene | Red. |
| 61 | p-CH$_3$ | phenylene | CH$_2$CH$_2$SO$_2$CH$_3$ | C$_2$H$_5$ | m-tolylene | Yellow. |
| 62 | p-SO$_2$NH$_2$ | phenylene | CH$_2$CH$_2$CONH$_2$ | C$_2$H$_5$ | m-tolylene | Orange. |
| 63 | p-CF$_3$ | phenylene | CH$_2$CH$_2$OH | C$_2$H$_5$ | m-tolylene | Yellow. |

TABLE—Continued

| Example | Substituents (x) on R | R¹ | R² | R³ | R⁴ | Color |
|---|---|---|---|---|---|---|
| 64 | p-SO₂N(CH₃)₂ | phenylene | CH₂CH₂N(CO)₂C₆H₄ (phthalimido) | C₂H₅ | m-tolylene | Yellow-orange. |
| 65 | 4-CH₃SO₂-2-Cl | phenylene | CH₂CH₂OCONH—C₆H₅ | C₂H₅ | m-tolylene | Orange. |
| 66 | p-(CH₂CO)₂N— | phenylene | C₂H₅ | | C₂H₄Cl | m-tolylene | Yellow. |

The disazo compounds of the invention can be used for dyeing textile materials, including protein and synthetic polymer fibers, yarns and fabrics, giving a variety of fast brilliant yellow to violet shades, including orange, violet, red and scarlet, when applied thereto by conventional dye methods. The disazo compounds have high affinity for cellulose ester, polyester, and nylon fibers. When the compounds are used for dyeing such hydrophobic materials, they should be free of water-solubilizing groups such as sulfo and carboxyl. In general, the dyes have excellent fastness, for example, to light, washing, gas (atmospheric fumes) and sublimation. The dyes are outstandingly sublimation resistant on polyesters.

As described above, the present disazo compounds have the characteristic structure of Formula I. This distinctive structure imparts unexpected properties to the compounds, including the above-described light fastness and sublimation resistance. Thus, the compounds of the invention, in general, possess superior properties when compared with similar, but distinct, dyes when tested by methods such as described in the A.A.T.C. Technical Manual, 1964 edition, depending in part upon the particular dye used and the fiber being dyed.

The compounds of the invention can be used for dyeing ester, acrylic, polyamide, etc., fibers in the manner described in U.S. Patents 2,880,050, 2,757,064, 2,782,187 and 2,043,827. The following example illustrates a method by which the disazo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the compounds of the invention are water-insoluble, they can be applied from aqueous dispersions in the manner of the so-called "dispersed dyes." However, coloration can also be effected, for example, by incorporating the compounds into the spinning dope and spinning the fiber as usual. The compounds of the invention have varying utility as dyes. The degree of utility varies, for example, depending upon the material being dyed and the formula of the disazo compound. Thus, for example, all the dyes will not have the same degree of utility for the same material. For example, the substituents X and Y and the substituents R² and R³, as mentioned above, serve primarily as auxochrome groups to control the color of the disazo compound.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the disazo compounds.

The invention has been described in considerable detail with particular reference to certain preferred embodiments thereof, but it will be understood that variations and modifications can be effected within the spirit and scope of the invention as described above and as defined in the appended claims.

We claim:

1. A disazo compound having the formula

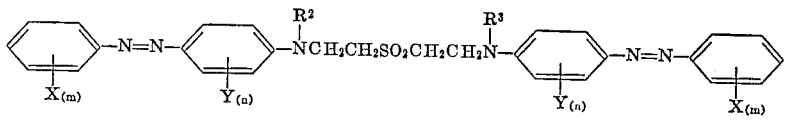

wherein:
X is lower alkyl, lower alkoxy, trifluoromethyl, lower alkanoylamino, nitro, chlorine, bromine, cyano, lower alkylsulfonyl, cyanoethylsulfonyl, phenylsulfonyl, carbamoyl, benzamido, lower carbalkoxy, lower alkanoyl, formyl, sulfamoyl, lower alkylsulfamoyl, succinimido, thiocyano, benzoyl, lower alkylthio, or phenoxy;
$m$ is 0, 1, 2 or 3;
Y is lower alkyl, lower alkoxy, chlorine, bromine or lower alkanoylamino, each Y being the same or different;
$n$ is 0, 1 or 2; and
R² and R³ are the same or different and each is hydrogen; lower alkyl; lower alkyl substituted with lower alkoxy, hydroxy, chlorine, bromine, cyano, lower alkanoyloxy, lower carbalkoxy, lower alkylsulfonyl, lower alkyl-OCCO—, carbamoyl, lower alkylcarbamoyl, phthalimido, succinimido, phenoxy, phenylcarbamoyloxy, or lower alkylsulfonamido; or benzyl.

2. A disazo compound according to claim 1 wherein

X is nitro, chlorine, bromine, cyano, lower alkylsulfonyl, trifluoromethyl or carbamoyl;

m is 1, 2 or 3; and $R^2$ and $R^3$ each is lower alkyl or lower alkyl substituted with hydroxy, chlorine, bromine, cyano or lower alkanoyloxy.

3. A disazo compound according to claim 1 having the formula

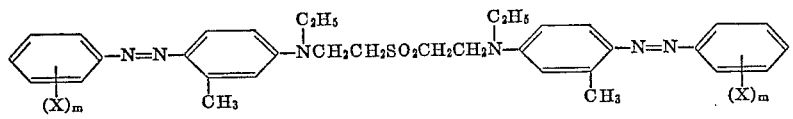

wherein

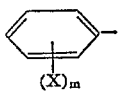

is 4-nitrophenyl, 2-chloro-4-nitrophenyl, or 2-methylsulfonyl-4-nitrophenyl.

4. A disazo compound according to claim 1 having the formula

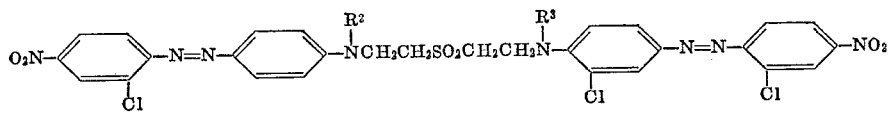

wherein $R^2$ and $R^3$ are the same and each is 2-hydroxyethyl or 2-acetoxyethyl.

References Cited
UNITED STATES PATENTS

| | | | |
|---|---|---|---|
| 1,973,636 | 9/1934 | Lantz | 260—184 |
| 1,976,010 | 10/1934 | Dahlen | 260—184 |
| 1,978,783 | 10/1934 | Dahlen | 260—184 |

CHARLES B. PARKER, *Primary Examiner.*

G. F. WARREN, *Assistant Examiner.*

U.S. Cl. X.R.

260—152, 465, 490, 558, 570.5